(12) United States Patent
Guen

(10) Patent No.: US 11,063,303 B2
(45) Date of Patent: Jul. 13, 2021

(54) RECHARGEABLE BATTERY HAVING CURRENT COLLECTOR

(71) Applicant: SAMSUNG SDI CO., LTD., Yongin-si (KR)

(72) Inventor: Minhyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 147 days.

(21) Appl. No.: 15/627,039

(22) Filed: Jun. 19, 2017

(65) Prior Publication Data

US 2018/0040918 A1 Feb. 8, 2018

(30) Foreign Application Priority Data

Aug. 8, 2016 (KR) ........................ 10-2016-0100746

(51) Int. Cl.
*H01M 10/0587* (2010.01)
*H01M 50/528* (2021.01)
*H01M 50/538* (2021.01)
*H01M 50/581* (2021.01)
(Continued)

(52) U.S. Cl.
CPC ... *H01M 10/0587* (2013.01); *H01M 10/0525* (2013.01); *H01M 50/3425* (2021.01); *H01M 50/528* (2021.01); *H01M 50/538* (2021.01); *H01M 50/581* (2021.01); *H01M 2200/103* (2013.01); *H01M 2200/20* (2013.01); *H01M 2220/20* (2013.01)

(58) Field of Classification Search
CPC ....... H01M 2004/025; H01M 10/0431; H01M 10/045; H01M 10/0587; H01M 4/70; H01M 4/75; H01M 2/02-0295; H01M 10/0413-049; H01M 2/027; H01M 2/0272; H01M 2/0285
See application file for complete search history.

(56) References Cited

U.S. PATENT DOCUMENTS 6,692,863 B1 * 2/2004 Nakanishi ............ H01M 2/263
429/133
2003/0111512 A1 6/2003 O'Connell et al.
(Continued)

FOREIGN PATENT DOCUMENTS

CN 101443936 A 5/2009
CN 101894967 A 11/2010
(Continued)

OTHER PUBLICATIONS

Machine translation of JP2014-017053A (Year: 2014).*
(Continued)

*Primary Examiner* — Eric R Smith
(74) *Attorney, Agent, or Firm* — Lewis Roca Rothgerber Christie LLP

(57) ABSTRACT

A rechargeable battery includes: an electrode assembly including a first electrode and a second electrode; a case receiving the electrode assembly; a cap plate bonded to the case; a first terminal electrically connected to the first electrode and protruded outside the cap plate; and a first current collector electrically connecting the first electrode and the first terminal, and the first current collector includes a first groove formed in a first surface facing toward the first electrode.

9 Claims, 9 Drawing Sheets

(51) Int. Cl.
*H01M 50/342* (2021.01)
*H01M 10/0525* (2010.01)

(56) References Cited

U.S. PATENT DOCUMENTS

| | | | | |
|---|---|---|---|---|
| 2004/0023108 A1* | 2/2004 | Nakanishi | ............... | H01M 2/30 429/178 |
| 2006/0234120 A1* | 10/2006 | Hamasaki | ............ | H01M 2/263 429/161 |
| 2007/0298317 A1* | 12/2007 | Brodd | ................... | H01M 2/263 429/94 |
| 2010/0216001 A1* | 8/2010 | Byun | ...................... | H01M 4/70 429/94 |
| 2010/0233521 A1* | 9/2010 | Byun | ................... | H01M 2/263 429/72 |
| 2010/0297484 A1 | 11/2010 | Kim | | |
| 2011/0129718 A1* | 6/2011 | Lee | ....................... | H01M 10/02 429/153 |
| 2011/0287309 A1* | 11/2011 | Lee | ....................... | H01M 2/263 429/179 |
| 2012/0214036 A1* | 8/2012 | Kim | ....................... | H01M 2/26 429/94 |
| 2013/0136960 A1* | 5/2013 | Guen | ................... | H01M 2/348 429/61 |
| 2014/0147716 A1 | 5/2014 | Oh et al. | | |
| 2015/0056506 A1 | 2/2015 | Lilley et al. | | |

FOREIGN PATENT DOCUMENTS

| | | | |
|---|---|---|---|
| CN | 103733411 A | | 4/2014 |
| JP | 2002298823 A | * | 10/2002 |
| JP | 2003-223880 A | | 8/2003 |
| JP | 2014017053 A | * | 1/2014 |
| KR | 20080038662 A | * | 5/2008 |
| KR | 10-2014-0113646 A | | 9/2014 |

OTHER PUBLICATIONS

Machine translation of JP2002-298823A (Year: 2002).*
Machine translation of KR2008-0083662A (Year: 2008).*
Office Action from corresponding Chinese Patent Application No. 201710479756.2, Chinese Office Action dated Jun. 1, 2021 and accompanying search report dated May 17, 2021 (16 pages with English translation).

* cited by examiner

RECHARGEABLE BATTERY HAVING CURRENT COLLECTOR

CROSS-REFERENCE TO RELATED APPLICATION

This application claims priority to and the benefit of Korean Patent Application No. 10-2016-0100746, filed on Aug. 8, 2016 in the Korean Intellectual Property Office, the entire content of which is incorporated herein by reference.

BACKGROUND

1. Field

Aspects of embodiments of the present invention relate to a rechargeable battery. More particularly, aspects of embodiments of the present invention relate to a rechargeable battery having a current collector.

2. Description of the Related Art

A rechargeable battery can be repeatedly charged and discharged, unlike a primary battery that is incapable of being recharged. A low-capacity rechargeable battery is used in small portable electronic devices such as mobile phones, laptop computers, and camcorders, while a high-capacity rechargeable battery is widely used as a power source for driving a motor, such as a motor of a hybrid vehicle, an electric vehicle, and the like.

A high-power rechargeable battery using a non-aqueous electrolyte with high energy density has been developed, and the high-power rechargeable battery is formed by coupling a plurality of rechargeable batteries in series to be used as a power source for driving a motor of a device requiring a large amount of electric power, for example, an electric vehicle, a hybrid vehicle, and the like.

In addition, a high-capacity battery module normally includes a plurality of rechargeable batteries connected in series, and a rechargeable battery may be formed in a cylindrical or prismatic shape. Also, the rechargeable battery has an electrode assembly performing the charge and discharge, and the electrode assembly includes a positive electrode, a negative electrode, and a separator interposed between the positive electrode and the negative electrode. The electrode assembly is formed of a structure in which a plurality of positive electrode plates and negative electrode plates are deposited or stacked; however, the electrode assembly may be formed of a structure in which positive electrodes and negative electrodes of a belt shape are spiral-wound.

The electrode assembly is electrically connected to a terminal via a current collector; however, the current collector may be damaged in a process in which the current collector and the electrode assembly are bonded.

The above information disclosed in this Background section is only for enhancement of understanding of the background of the invention and therefore it may contain information that does not form the prior art that is already known in this country to a person of ordinary skill in the art.

SUMMARY

According to an aspect of embodiments of the present invention, a rechargeable battery is provided in which damage to a current collector during welding is prevented or substantially prevented.

A rechargeable battery according to the present invention includes: an electrode assembly including a first electrode and a second electrode; a case receiving the electrode assembly; a cap plate bonded to the case; a first terminal electrically connected to the first electrode and protruded outside the cap plate; and a first current collector electrically connecting the first electrode and the first terminal, and the first current collector includes a first groove formed in a first surface facing toward the first electrode.

The first electrode may include a first electrode tab protruded toward the cap plate, the first electrode tab may include a bonding part welded to the first current collector, and the bonding part may be in the first groove.

The bonding part may be made of an ultrasonic welding part formed by ultrasonic welding, and the first current collector may include a plurality of minute protrusions in the first groove.

The first current collector may further include a second groove formed in a second surface facing toward a direction opposite to the first surface formed with the first groove, and the first current collector may include a plurality of minute protrusions in the second groove. Two first grooves may be disposed to be separated in a width direction of the first current collector in the first surface.

The first current collector may include a supporting plate bonded to the first terminal, an electrode attaching part bonded to the first electrode, and a connecting part obliquely bent from the supporting plate and the electrode attaching part and connecting the supporting plate and the electrode attaching part, and the first groove may be formed in the electrode attaching part.

The supporting plate may have a fuse hole, and the fuse hole may extend in a width direction of the supporting plate, and the supporting plate may be arranged with a supporting member enclosing the fuse hole.

The electrode assembly may have a spiral-wound structure including a separator interposed between the first electrode and the second electrode, the electrode assembly may include a plurality of first electrode tabs protruded at an upper end of the electrode assembly, and the first electrode tabs may be welded to the first groove in a stacked state.

According to an aspect of one or more exemplary embodiments of the present invention, since the current collector is formed with the groove, an anvil or a horn may be inserted into the groove such that a load applied to the current collector may be minimized or reduced during welding.

DESCRIPTION OF SOME REFERENCE DESIGNATORS

Figure 1:
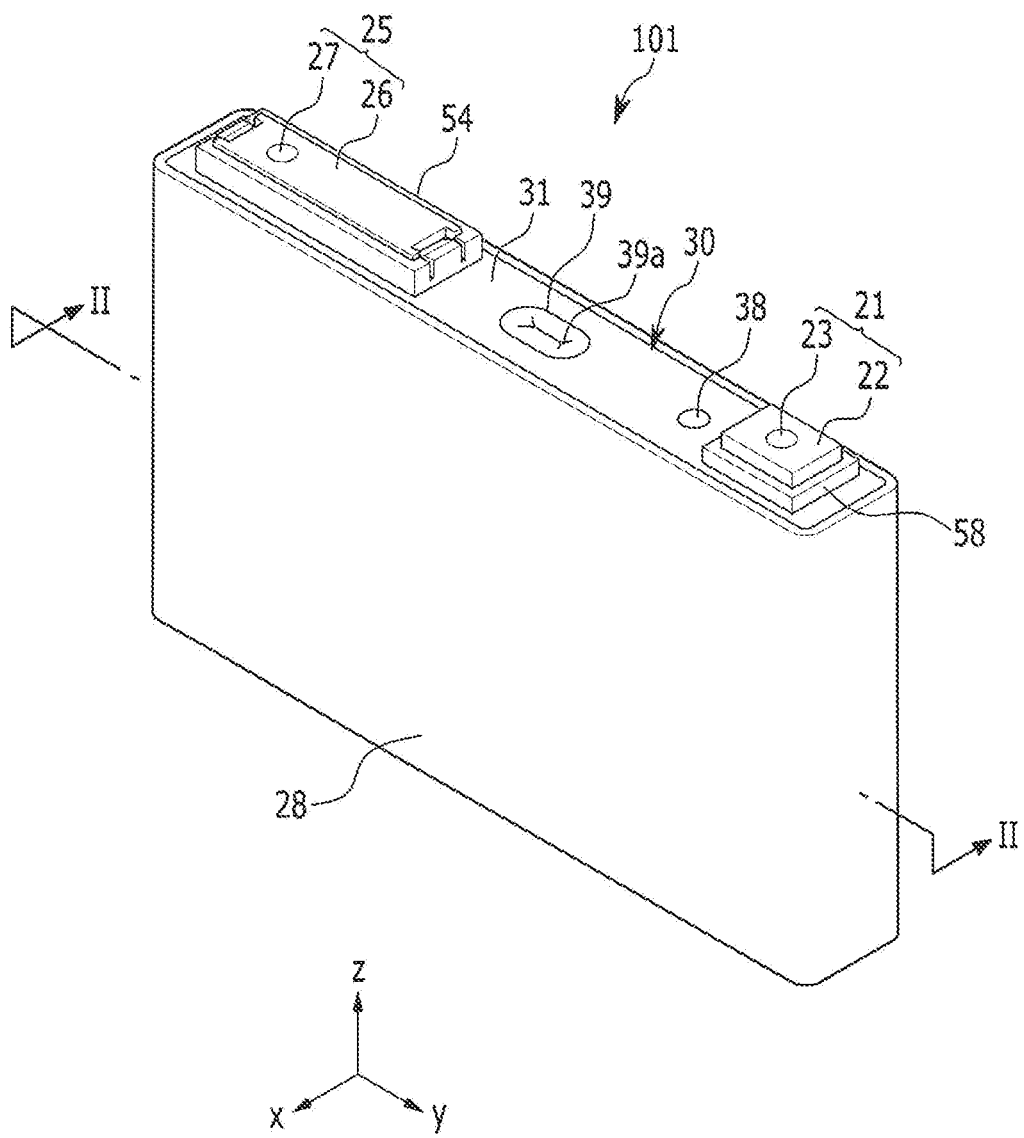
FIG. 1 is a perspective view of a rechargeable battery according to an exemplary embodiment of the present invention.

101: rechargeable battery
10: electrode assembly
11: first electrode
11a: first electrode tab
12: second electrode
12a: second electrode tab
13: separator
11aa, 12aa: bonding part
11ab 12ab: lead part
21: first terminal
22: first terminal plate
23: first terminal column
231, 271: column part
232, 272: flange part
235, 273: lower protrusion
25: second terminal
26: second terminal plate
261: short-circuit protrusion
27: second terminal column
28: case
30: cap assembly
31: cap plate
41, 61, 62, 63: first current collector
411, 421, 611, 621, 631, 641: supporting plate
412, 422, 612, 622, 632, 642: coupling hole
413, 423, 613, 623, 633, 643: electrode attaching part
415, 615, 625 635, 645: connecting part
416, 616, 626, 636, 646: fuse hole
417, 617, 627, 637: first groove
417a, 617a, 618a: minute protrusion
419: vent hole
42, 64: second current collector
43, 45: lower insulating member
48: supporting member
54: upper insulating member
55, 59: sealing gasket
56: short-circuit member
58: connecting member
618, 638: second groove
647: third groove
648: fourth groove
71: horn
72: anvil

DETAILED DESCRIPTION

The present invention will be described more fully hereinafter with reference to the accompanying drawings, in which some exemplary embodiments of the invention are shown. As those skilled in the art would realize, the described embodiments may be modified in various different ways, all without departing from the spirit or scope of the present invention. Accordingly, the drawings and description are to be regarded as illustrative in nature and not restrictive. In addition, like reference numerals denote like elements in the specification and the accompanying drawings.

Figure 2:
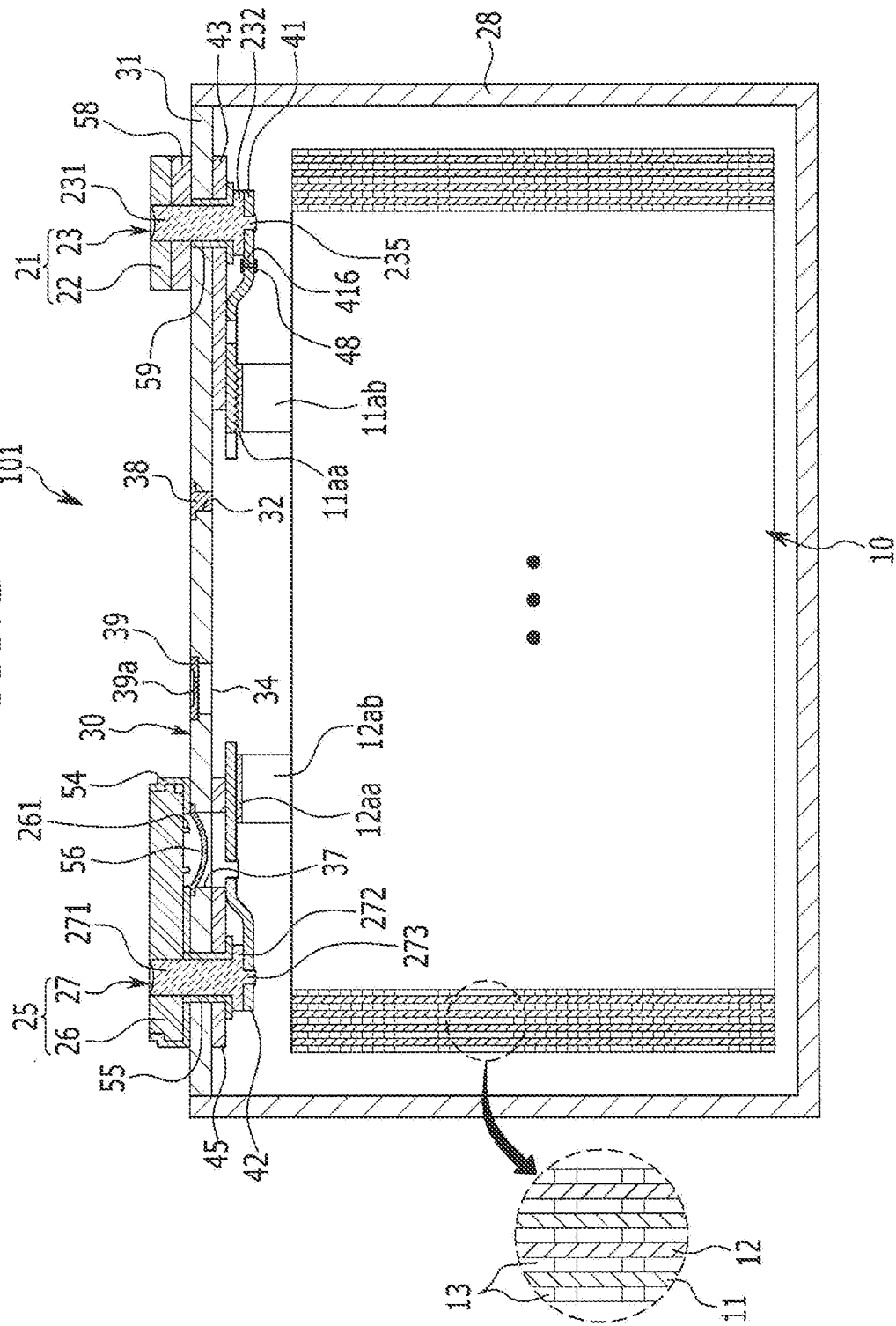
FIG. 2 is a cross-sectional view taken along the line II-II in FIG. 1.

FIG. 1 is a perspective view of a rechargeable battery according to an exemplary embodiment of the present invention; and FIG. 2 is a cross-sectional view taken along the line II-II in FIG. 1.

Referring to FIG. 1 and FIG. 2, a rechargeable battery 101 according to the present exemplary embodiment includes an electrode assembly 10 formed by winding a first electrode (e.g., a positive electrode) 11 and a second electrode (e.g., a negative electrode) 12 with a separator 13 interposed therebetween, a case 28 for accommodating the electrode assembly 10, and a cap assembly 30 combined to an opening of the case 28.

The rechargeable battery 101 according to the present exemplary embodiment will be described with reference to an example with a quadrangular shape as a lithium ion rechargeable battery. However, embodiments of the present invention are not limited thereto, and the present invention may be applied to various types of batteries including a lithium polymer battery or a cylindrical battery. Also, the rechargeable battery 101 according to the present exemplary embodiment may be particularly made as a high-output starting battery with a quadrangular shape for a vehicle.

The case 28, according to an embodiment, is substantially formed in the shape of a cuboid, and includes an opening formed in one side thereof. The case 28 may be made of a metal, such as aluminum, stainless steel, and the like.

The cap assembly 30 includes a cap plate 31 covering the opening of the case 28, a first terminal 21 protruding to the outside of the cap plate 31 and electrically connected with the first electrode 11, and a second terminal 25 protruding to the outside of the cap plate 31 and electrically connected with the second electrode 12.

The cap plate 31 is formed in the shape of a plate extended in a direction, and is coupled to the opening of the case 28. A sealing cap 38 provided in an electrolyte injection opening 32 and a vent plate 39 having a notch 39a formed to be ruptured at a reference pressure (e.g., a predetermined pressure) formed in a vent hole 34 are provided in the cap plate 31. In an embodiment, the first terminal 21 and the second terminal 25 protrude upward from the cap plate 31.

The first terminal 21 is electrically connected to the first electrode 11 via a first current collector 41, and the second terminal 25 is electrically connected to the second electrode 12 via a second current collector 42. However, the present invention is not limited thereto, and the first terminal 21 may be electrically connected to the second electrode (e.g., a negative electrode) 12, and the second terminal 25 may be electrically connected to the first electrode (e.g., a positive electrode) 11.

In an embodiment, the first terminal 21 includes a first terminal plate 22 having a plate shape and a first terminal column 23 penetrating the first terminal plate 22. The first terminal plate 22 is disposed on the cap plate 31 to be parallel to the cap plate 31 and is electrically connected to the first electrode 11 via the first terminal column 23.

The first terminal column 23 is formed having a bar shape to be installed while penetrating the first terminal plate 22 and the cap plate 31. The first terminal column 23 includes a column part 231 with the bar shape, a flange part 232 protruded from a lower part of the column part 231 in a side direction, and a lower protrusion 235 protruded downward from a lower surface of the column part 231.

An upper end of the first terminal column 23 is fixed to the first terminal plate 22, such as by welding, while being inserted into the first terminal plate 22. Also, a lower end of the first terminal column 23 is bonded to the first current collector 41, such as by welding. The lower protrusion 235 is inserted into a coupling hole 412 (see FIG. 3) formed in the first current collector 41, and a lower end of the lower protrusion 235 and the first current collector 41 are welded together.

A sealing gasket 59 is installed by being inserted into a hole of the cap plate 31 penetrated by the first terminal column 23 between the first terminal column 23 and the cap plate 31, and a lower insulating member 43 supporting the first current collector 41 is installed under the cap plate 31.

A connecting member 58 electrically connecting the first terminal 21 and the cap plate 31 is installed under the first terminal plate 22. Accordingly, the cap plate 31 and the case 28 have a same polarity (e.g., a positive voltage).

The second terminal 25 includes a second terminal plate 26 having a plate shape and a second terminal column 27 installed to penetrate the second terminal plate 26. The second terminal plate 26 is disposed on the cap plate 31 to be parallel to the cap plate 31 and is electrically connected to the second electrode 12 via the second terminal column 27.

The second terminal column 27 has a bar shape to penetrate the second terminal plate 26 and the cap plate 31. The second terminal column 27 includes a column part 271 with a bar shape, a flange part 272 protruded from the lower part of the column part 271 in the side direction, and a lower protrusion 273 protruded under a lower surface of the column part 271.

The upper end of the second terminal column 27 is fixed to the second terminal plate 26 while being inserted into the second terminal plate 26. Also, the lower end of the second terminal column 27 is bonded to the second current collector 42, such as by welding. The lower protrusion 273 is inserted into a coupling hole 422 (see FIG. 3) formed on the second current collector 42, and a lower end of the lower protrusion 273 and the second current collector 42 are welded together.

A sealing gasket 55 for sealing is inserted and installed to a hole of the cap plate 31 penetrated by the second terminal column 27 between the second terminal column 27 and the cap plate 31, and a lower insulating member 45 supporting the second current collector 42 and insulated from the cap plate 31 is installed under the cap plate 31.

In an embodiment, a short-circuit protrusion 261 protruded toward a short-circuit hole 37 is formed at a lower surface of the second terminal plate 26. The second terminal 25 is elongated in a direction to cover the short-circuit hole 37. An upper insulating member 54 electrically insulating the second terminal 25 and the cap plate 31 is installed between the second terminal 25 and the cap plate 31.

The cap assembly 30 includes a short-circuit member 56 to short-circuit the first electrode 11 and the second electrode 12. The short-circuit member 56 is electrically connected to the cap plate 31 and is deformed when an internal pressure of the rechargeable battery 101 is increased to be connected with the second terminal 25.

The short-circuit hole 37 is formed in the cap plate 31, and the short-circuit member 56 is disposed between the upper insulating member 54 and the cap plate 31 in the short-circuit hole 37. Also, the second terminal plate 26 is disposed above the short-circuit hole 37 to cover the short-circuit hole 37. The short-circuit member 56 includes a curved part that is bent in an arc to be convex downward in a normal operating state, and a border part fixed to the cap plate 31.

When a gas is generated inside the rechargeable battery 101 because of an abnormal reaction, internal pressure of the rechargeable battery 101 increases. When the internal pressure of the rechargeable battery 101 becomes greater than a reference pressure (e.g., a predetermined pressure), the curved part of the short-circuit member 56 is transformed to be convex upward, and the short-circuit protrusion 261 and the short-circuit member 56 contact each other to cause a short circuit.

Figure 3:
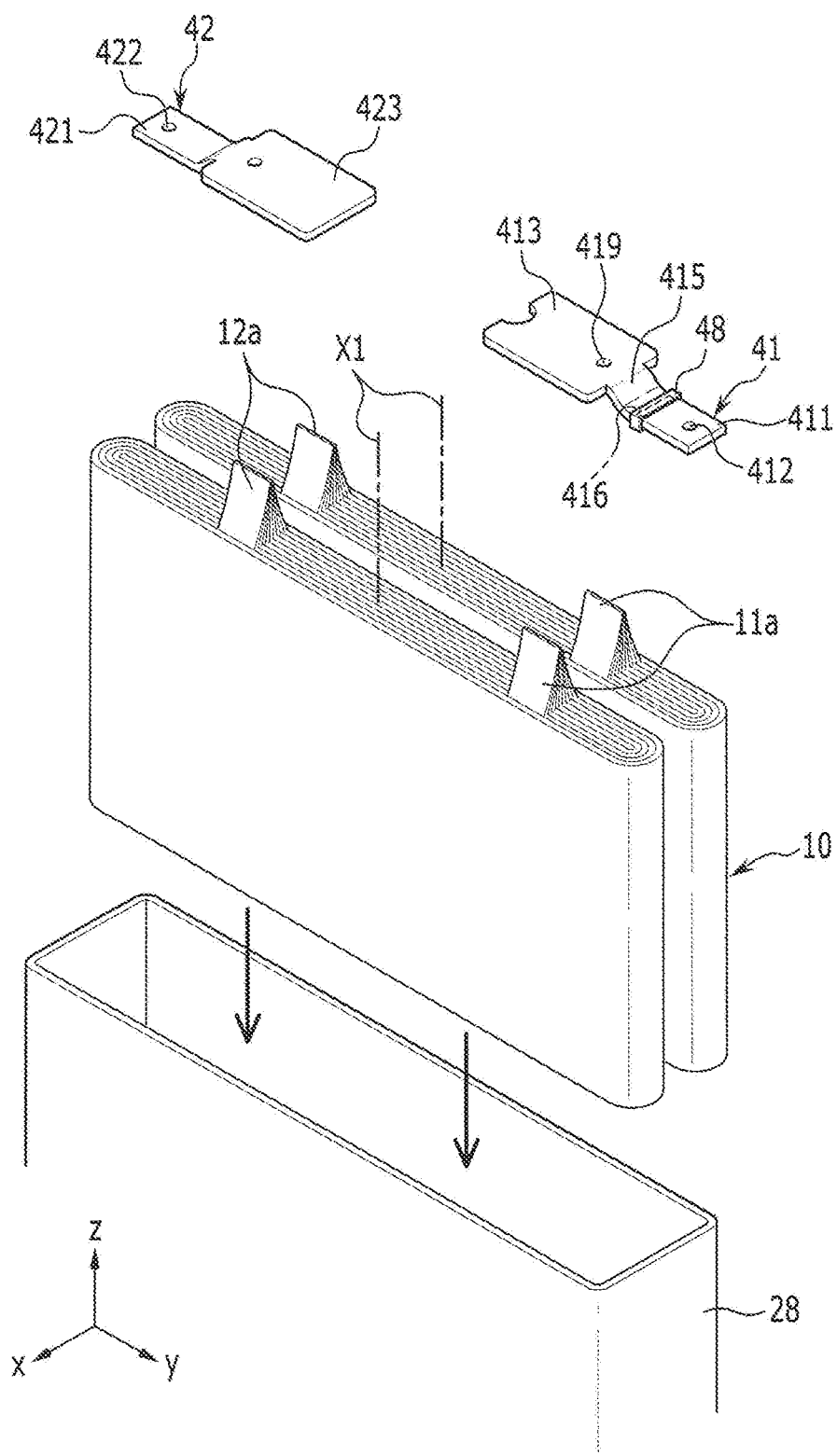
FIG. 3 is an exploded perspective view of a part of a rechargeable battery according to an exemplary embodiment of the present invention.

FIG. 3 is an exploded perspective view of a part of a rechargeable battery according to an exemplary embodiment of the present invention.

Referring to FIG. 2 and FIG. 3, the electrode assembly 10 includes the first electrode 11, the second electrode 12, and the separator 13 disposed between the first electrode 11 and the second electrode 12, and is formed of a spiral-wound structure based on a winding axis X1. One or more electrode assemblies 10 may be inserted into the case 28.

The first electrode 11 includes a first coating region formed with a first active material layer (e.g., a positive active material layer), and a first electrode tab 11a in which the first active material layer is not formed, and a plurality of first electrode tabs 11a are deposited or stacked. Also, the second electrode 12 includes a second coating region formed with a second active material layer (e.g., a negative active material layer), and a second electrode tab 12a in which the second active material layer is not formed, and a plurality of second electrode tabs 12a are deposited or stacked.

In an embodiment, the first electrode tab 11a and the second electrode tab 12a are protruded to be parallel to the winding axis X1 toward the cap plate 31 at the upper end of the electrode assembly 10, and are disposed to be separated from each other in a width direction of the electrode assembly 10. The first electrode tab 11a includes a bonding part 11aa welded to the first current collector 41, and a lead part 11ab protruded from the upper end of the electrode assembly 10 and connected to the bonding part 11aa. The second electrode tab 12a includes a bonding part 12aa welded to the second current collector 42, and a lead part 12ab protruded from the upper end of the electrode assembly 10 and connected to the bonding part 12aa.

The first current collector 41, in an embodiment, is disposed to be parallel to the cap plate 31 above the electrode assembly 10. The first current collector 41 includes a supporting plate 411 bonded to the first terminal column 23, an electrode attaching part 413 bonded to the first electrode tab 11a, and a connecting part 415 bent from the supporting plate 411 to be obliquely extended and connecting the supporting plate 411 and the electrode attaching part 413. In an embodiment, the supporting plate 411 is positioned lower than the electrode attaching part 413.

The supporting plate 411 is formed having a quadrangular plate shape and is fixed under the terminal column 25, such as by welding. In an embodiment, a coupling hole 412 is formed in the supporting plate 411, and the first terminal column 23 and the supporting plate 411 are welded in a state in which the lower protrusion 235 formed under the first terminal column 23 is inserted in the coupling hole 412.

In an embodiment, a fuse hole 416 is formed in the supporting plate 411, and a part where the fuse hole 416 is formed has a smaller cross-sectional area than a surrounding area, such as to be melted when an overcurrent flows. The fuse hole 416 may be formed to be continuous in a width direction of the supporting plate 411.

A supporting member 48 enclosing the fuse hole 416 may be installed on the supporting plate 411. The electrode attaching part 413 is formed as a quadrangular plate, and a vent hole 419 may be formed on the electrode attaching part 413.

The second current collector 42 includes a supporting plate 421 bonded to the second terminal column 27, and an electrode attaching part 423 bent from the supporting plate 421 toward the electrode assembly 10 and directly bonded to the second electrode tab 12a. In an embodiment, the electrode attaching part 423 is bent to be parallel to the electrode assembly 10 from an end part of the supporting plate 421 in a width direction.

The supporting plate 421 is formed having a quadrangular plate shape and is fixed to the lower part of the second terminal column 27, such as by welding. In an embodiment, a coupling hole 422 is formed in the supporting plate 421, and the second terminal column 27 and the supporting plate 421 are welded in a state in which the lower protrusion 273 formed under the second terminal column 27 is inserted into the coupling hole 422.

Figure 4:
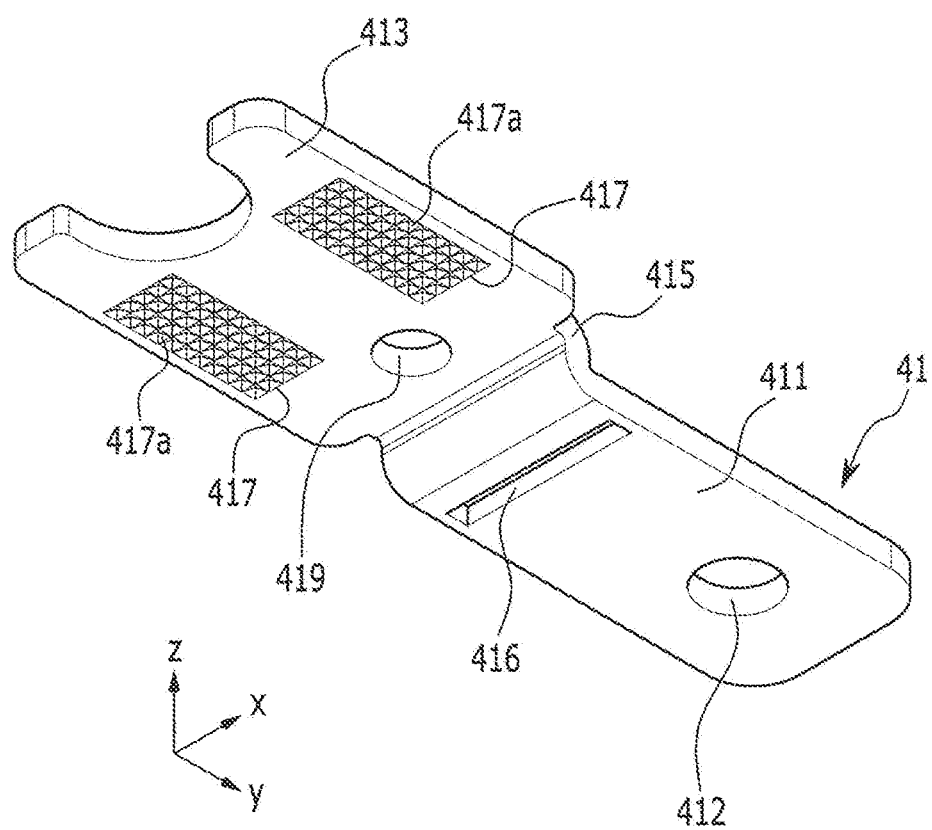
FIG. 4 is a bottom perspective view of a first electrode tab according to an exemplary embodiment of the present invention.

As shown in FIG. 4, in an embodiment, a first groove 417 is formed on a first surface of the first current collector 41 facing toward the first electrode 11, and a plurality of minute protrusions 417a are arranged in the first groove 417 while forming a pattern. The first groove 417 is formed at the lower surface of the electrode attaching part 413.

In an embodiment, a plurality of first grooves 417 is formed in the first current collector 41, and the first grooves 417 are arranged to be separated in the width direction (e.g., an x-axis direction) of the first current collector 41. The first groove 417, in an embodiment, has a rectangular cross-section, and the first groove 417 is formed with a structure that is continuous in the length direction (e.g., a y-axis direction) of the first current collector 41. The first groove 417 is formed in a thickness direction of the first current collector 41 to be recessed, the first groove 417 receives the first electrode tab 11a inserted therein, and the bonding part 11aa welded to the first current collector 41 is positioned at the first groove 417. The bonding part 11aa is bonded to the first groove 417 by ultrasonic welding, thereby forming an ultrasonic welding part.

Figure 5:
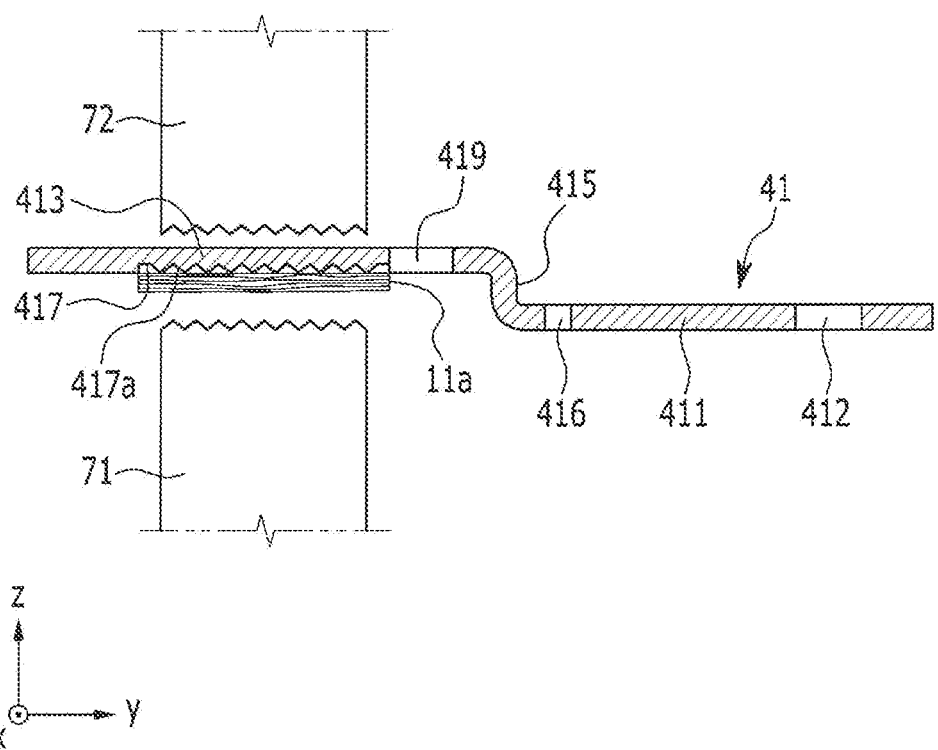
FIG. 5 is a cross-sectional view showing a process of welding a first electrode to a first electrode tab according to an exemplary embodiment of the present invention.

As shown in FIG. 5, the first electrode tab 11a is ultrasonically welded by a horn 71 and an anvil 72 in a state in which the bonding part 11aa is inserted in the first groove 417, such that a patter of the minute protrusions 417a may be formed to correspond to a pattern formed in the horn 71.

In the present exemplary embodiment, the first groove 417 and the minute protrusions 417a are formed, such that an interval between the horn 71 and the anvil 72 may be reduced. Because the interval is reduced, the first electrode tab 11a and the first current collector 41 may be welded by applying ultrasonic waves of a low frequency. Accordingly, because a load applied near the fuse hole 416 is reduced, the surroundings of the fuse hole 416 may be prevented or substantially prevented from being damaged by the ultrasonic welding.

Conventionally, if the groove is not formed, ultrasonic waves of a relatively high frequency must be applied such that a problem that a weak portion is broken may occur. Also, in the conventional art, since the ultrasonic welding is performed by positioning the first electrode tab at a flat surface, only the part that is protruded in the horn contacts and is welded with the first electrode tab and only the pattern formed in the horn is transferred to the first electrode tab. However, according to the present exemplary embodiment, since the first electrode tab is in contact with the horn with the wide area, the area to which the ultrasonic wave vibration is transmitted is widened such that the welding efficiency may be improved.

Figure 6:
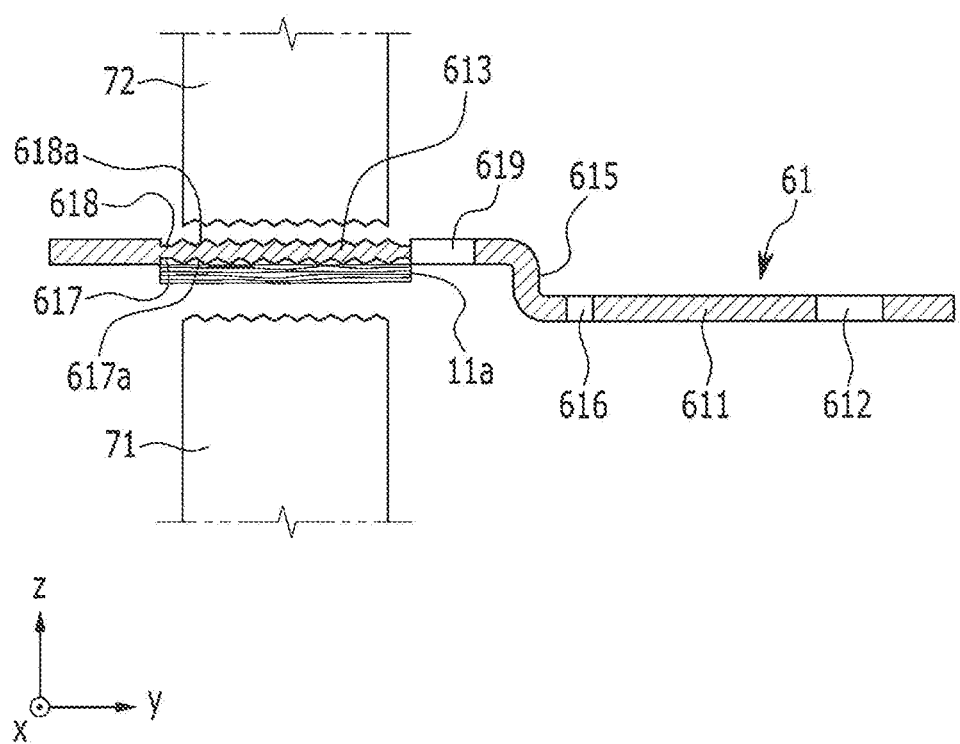
FIG. 6 is a cross-sectional view showing a process of welding a first electrode to a first electrode tab according to another exemplary embodiment of the present invention.

Next, a rechargeable battery according to another exemplary embodiment will be described with reference to FIG. 6. FIG. 6 is a cross-sectional view showing a process of welding a first electrode to a first electrode tab according to another exemplary embodiment of the present invention.

Referring to FIG. 6, a rechargeable battery according to another exemplary embodiment is formed with a same structure as the rechargeable battery 101 according to the exemplary embodiment described above except for a first current collector 61. Therefore, repeated description of the same components and structures is omitted.

The first current collector 61 includes a supporting plate 611 bonded to the first terminal column 23, an electrode attaching part 613 bonded to the first electrode tab 11a, and a connecting part 615 bent from the supporting plate 611 to be obliquely extended and connecting the supporting plate 611 and the electrode attaching part 613. In an embodiment, the supporting plate 611 is positioned lower than the electrode attaching part 613.

The supporting plate 611 is formed having a quadrangular plate shape and is fixed under the first terminal column 23, such as by welding. In an embodiment, a coupling hole 612 is formed in the supporting plate 611, and the first terminal column 23 and the supporting plate 611 are welded in a state in which the lower protrusion 235 formed under the first terminal column 23 is inserted in the coupling hole 612.

A fuse hole 616 is formed in the supporting plate 611, and a part where the fuse hole 616 is formed has a smaller cross-sectional area than the surrounding area, thereby being melted when an overcurrent flows. The fuse hole 616 may be formed to extend in a width direction of the supporting plate 611. The electrode attaching part 613 is formed having a quadrangular plate shape, and a vent hole 619 may be formed in the electrode attaching part 613.

In an embodiment, a first surface of the first current collector 61 facing toward the first electrode 11 is formed with a first groove 617, and a plurality of minute protrusions 617a is arranged while forming a pattern in the first groove 617. In an embodiment, a plurality of first grooves 617 is formed in the first current collector 61, and the first grooves 617 are arranged to be separated in a width direction (e.g., the x-axis direction) of the first current collector 61. In an embodiment, the first groove 617 has a rectangular cross-section, and the first groove 617 is formed with a structure that is elongated in a length direction (e.g., the y-axis direction) of the first current collector 61. The first groove 617 is formed to be recessed in the thickness direction of the first current collector 61, the first groove 617 receives the first electrode tab 11a inserted therein, and the bonding part 11aa welded to the first current collector 61 is positioned at the first groove 617. The bonding part 11aa is bonded to the first groove 617 by ultrasonic welding, thereby forming the ultrasonic welding part.

In the first current collector 61, a second groove 618 is formed in a second surface facing toward the direction opposite to the first surface where the first groove 617 is formed, and a plurality of minute protrusions 618a are arranged while forming a pattern in the second groove 618. In an embodiment, a plurality of second grooves 618 is formed in the first current collector 61, and the second grooves 618 are disposed at positions corresponding to the first grooves 617.

In the state in which the first electrode tab 11a is inserted in the first groove 617, the horn 71 is inserted into the first groove and the anvil 72 is inserted into the second groove 618. The pattern of the minute protrusions 617a may be formed to correspond to the pattern formed in the horn 71 in the first groove 617, and the pattern of the minute protrusions 618a formed in the second groove 618 may be formed to correspond to a pattern formed in the anvil 72.

In the present exemplary embodiment, the first groove 617 and the second groove 618 are formed, and the interval between the horn 71 and the anvil 72 may be reduced. Because the interval is reduced, the first electrode tab 11*a* and the first current collector 61 may be easily welded by applying the ultrasonic waves of the low frequency, and the first current collector 61 may be prevented or substantially prevented from being damaged.

Figure 7:
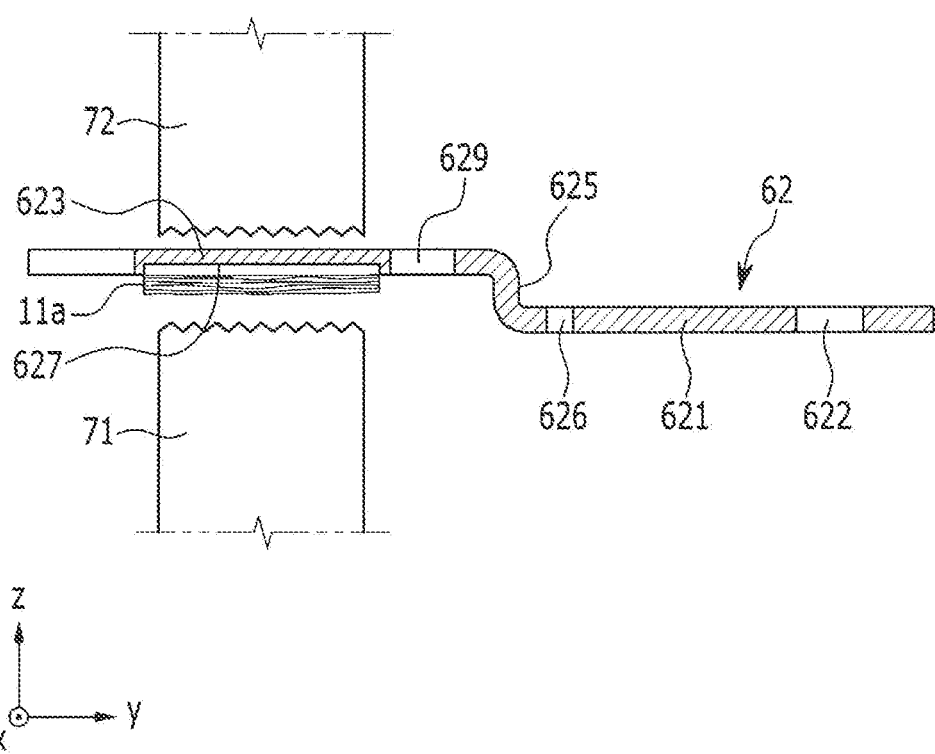
FIG. 7 is a cross-sectional view showing a process of welding a first electrode to a first electrode tab according to another exemplary embodiment of the present invention.

Next, a rechargeable battery according to another exemplary embodiment will be described with reference to FIG. 7. FIG. 7 is a cross-sectional view showing a process of welding a first electrode to a first electrode tab according to another exemplary embodiment of the present invention.

Referring to FIG. 7, a rechargeable battery according to another exemplary embodiment is the same as the rechargeable battery 101 according to the exemplary embodiment described above except for a first current collector 62. Therefore, repeated description of the same components and structures is omitted.

The first current collector 62 includes a supporting plate 621 bonded to the first terminal column 23, an electrode attaching part 623 bonded to the first electrode tab 11*a*, and a connecting part 625 bent from the supporting plate 621 to be obliquely extended and connecting the supporting plate 621 and the electrode attaching part 623. In an embodiment, the supporting plate 621 is positioned lower than the electrode attaching part 623.

The supporting plate 621 is formed having a quadrangular plate shape and is fixed under the first terminal column 23, such as by welding. In an embodiment, the supporting plate 621 has a coupling hole 622, and the first terminal column 23 and the supporting plate 621 are welded in a state in which the lower protrusion 235 formed under the first terminal column 23 is inserted in the coupling hole 622.

A fuse hole 626 is formed in the supporting plate 621, and the part where the fuse hole 626 is formed has a smaller cross-sectional area than the surrounding area, thereby being melted when an overcurrent flows. The fuse hole 626 may be formed to extend in a width direction of the supporting plate 621. The electrode attaching part 623 is formed as a quadrangular plate, and a vent hole 629 may be formed in the electrode attaching part 623.

A first surface of the first current collector 62 facing toward the first electrode 11 is formed with a first groove 627 recessed in the thickness direction of the first current collector 62. In an embodiment, a plurality of first grooves 627 is formed in the first current collector 62, and the first grooves 627 are arranged to be separated in a width direction (e.g., the x-axis direction) of the first current collector 62. In an embodiment, the first groove 627 has a rectangular cross-section, and first groove 627 is formed with a structure that is elongated in the length direction (e.g., the y-axis direction) of the first current collector 62. The first electrode tab 11*a* is inserted into the first groove 627, and the first electrode tab 11*a* is bonded to the bottom of the first groove 627 by ultrasonic welding.

In the state in which the first electrode tab 11*a* is inserted in the first groove 627, the horn 71 is inserted into the first groove 627 such that the ultrasonic welding is performed through the horn 71 and the anvil 72.

In the present exemplary embodiment, the first groove 627 is formed, and the interval between the horn 71 and the anvil 72 may be reduced. Because the interval is reduced, the first electrode tab 11*a* and the first current collector 62 may be easily welded by applying the ultrasonic waves of the low frequency, and the first current collector 62 may be prevented or substantially prevented from being damaged.

Figure 8:
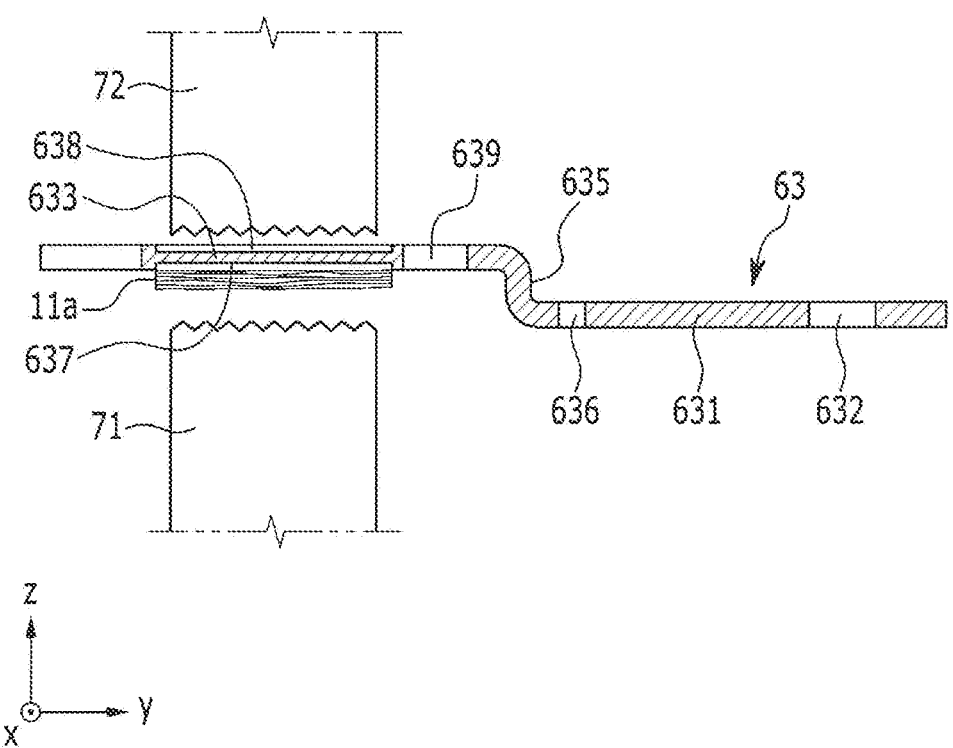
FIG. 8 is a cross-sectional view showing a process of welding a first electrode to a first electrode tab according to another exemplary embodiment of the present invention.

Next, a rechargeable battery according to another exemplary embodiment will be described with reference to FIG. 8 and FIG. 9. FIG. 8 is a cross-sectional view showing a process of welding a first electrode to a first electrode tab according to another exemplary embodiment of the present invention; and FIG. 9 is a cross-sectional view showing a process of welding a second electrode to a second electrode tab according to the exemplary embodiment of the present invention.

Figure 9:
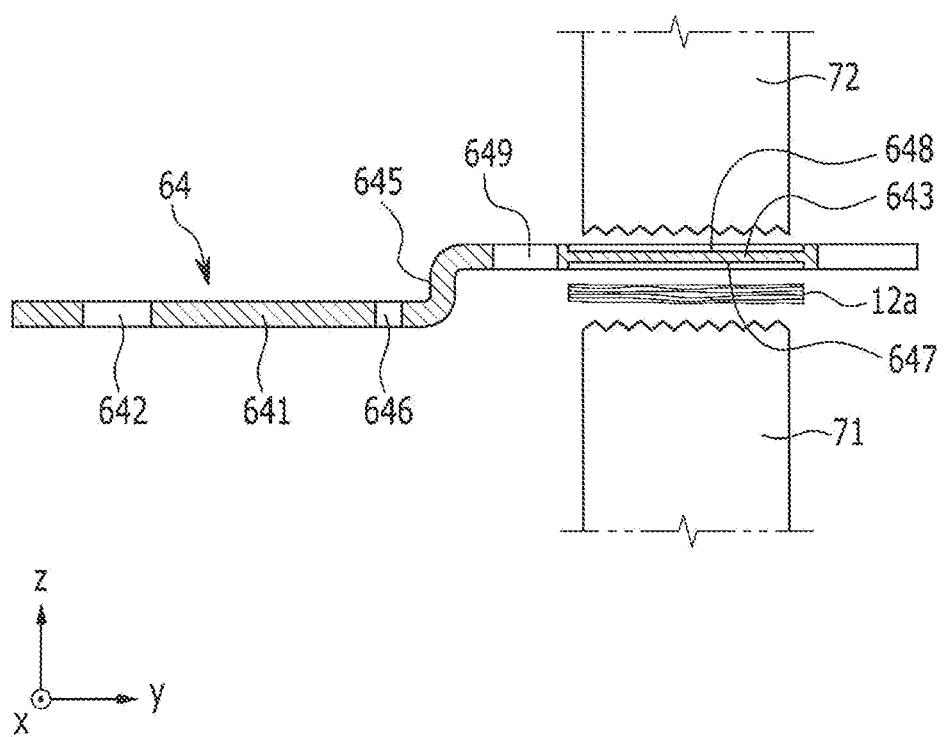
FIG. 9 is a cross-sectional view showing a process of welding a second electrode to a second electrode tab according to an exemplary embodiment of the present invention.

Referring to FIG. 8 and FIG. 9, a rechargeable battery according to another exemplary embodiment is the same as the rechargeable battery 101 according to the exemplary embodiment described above except for a first current collector 63 and a second current collector 64. Therefore, repeated description of the same components and structures is omitted.

The first current collector 63 includes a supporting plate 631 bonded to the first terminal column 23, an electrode attaching part 633 bonded to the first electrode tab 11*a*, and a connecting part 635 bent from the supporting plate 631 to be obliquely extended and connecting the supporting plate 631 and the electrode attaching part 633. In an embodiment, the supporting plate 631 is positioned lower than the electrode attaching part 633.

The supporting plate 631 is formed having a quadrangular plate shape and is fixed under the first terminal column 23, such as by welding. A coupling hole 632 is formed in the supporting plate 631, and the first terminal column 23 and the supporting plate 631 are welded in a state in which the lower protrusion 235 formed under the first terminal column 23 is inserted in the coupling hole 632.

A fuse hole 636 is formed in the supporting plate 631, and the part where the fuse hole 636 is formed has a smaller cross-sectional area than the surrounding area, thereby being melted when an overcurrent flows. The fuse hole 636 may be formed to extend in a width direction of the supporting plate 631. The electrode attaching part 633 is formed as a quadrangular plate, and a vent hole 639 may be formed in the electrode attaching part 633.

A first surface of the first current collector 63 facing toward the first electrode 11 is formed with a first groove 637 recessed in the thickness direction of the first current collector 63. In an embodiment, a plurality of first grooves 637 is formed in the first current collector 63, and the first grooves 637 are arranged to be separated in a width direction (e.g., the x-axis direction) of the first current collector 63. In an embodiment, the first groove 637 has a rectangular cross-section, and the first groove 637 is formed having a structure that is elongated in a length direction (e.g., the y-axis direction) of the first current collector 63. The first electrode tab 11*a* is inserted into the first groove 637, and the first electrode tab 11*a* is bonded to the bottom of the first groove 637 by the ultrasonic welding.

In the first current collector 63, a second groove 638 is formed in a second surface facing toward the direction opposite to the first surface formed with the first groove 637. In an embodiment, in the first current collector 63, a plurality of second grooves 638 are formed, and the second grooves 638 are disposed at positions corresponding to the first grooves 637.

In the state in which the first electrode tab 11*a* is inserted in the first groove 637, the horn 71 is inserted into the first groove and the anvil 72 is inserted into the second groove 638. In the present exemplary embodiment, the first groove 637 and the second groove 638 are formed, and the interval between the horn 71 and the anvil 72 may be reduced. Because the interval is reduced, the first electrode tab 11*a* and the first current collector 63 may be easily welded by applying the ultrasonic waves of the low frequency, and the first current collector 63 may be prevented or substantially prevented from being damaged.

The second current collector 64 includes a supporting plate 641 bonded to the second terminal column 27, an electrode attaching part 643 bonded to the second electrode tab 12*a*, and a connecting part 645 bent from the supporting plate 641 to be obliquely extended and connecting the supporting plate 641 and the electrode attaching part 643. In an embodiment, the supporting plate 641 is positioned lower than the electrode attaching part 643.

The supporting plate 641 is formed having a quadrangular plate shape and is fixed under the second terminal column 27, such as by welding. The supporting plate 641 has a coupling hole 642, and the second terminal column 27 and the supporting plate 641 are welded in a state in which the lower protrusion 273 formed under the second terminal column 27 is inserted in the coupling hole 642.

A fuse hole 646 is formed in the supporting plate 641, and the part where the fuse hole 646 is formed has a smaller cross-sectional area than the surrounding area, thereby being melted when an overcurrent flows. The fuse hole 646 may be formed to extend in a width direction of the supporting plate 641. The electrode attaching part 643 is formed as a quadrangular plate, and a vent hole 649 may be formed in the electrode attaching part 643.

A first surface of the second current collector 64 facing toward the second electrode 12 is formed with a third groove 647 recessed in the thickness direction of the second current collector 64. In an embodiment, a plurality of third grooves 647 are formed in the second current collector 64, and the third grooves 647 are arranged to be separated in a width direction (e.g., the x-axis direction) of the second current collector 64. In an embodiment, the third groove 647 has a rectangular cross-section, and the third groove 647 is formed having a structure that is elongated in a length direction (e.g., the y-axis direction) of the second current collector 64. The second electrode tab 12*a* is inserted into the third groove 647, and the second electrode tab 12*a* is bonded to the bottom of the third groove 647 by the ultrasonic welding.

In the second current collector 64, a fourth groove 648 is formed in a second surface facing toward the direction opposite to the first surface formed with the third groove 647. In an embodiment, a plurality of fourth grooves 648 is formed in the second current collector 64, and the fourth grooves 648 are disposed at positions corresponding to the third grooves 647.

In the state in which the second electrode tab 12*a* is inserted into the third groove 647, the horn 71 is inserted into the third groove 647 and the anvil 72 is inserted into the fourth groove 648. In the present embodiment, due to the first groove 647 and the second groove 648 being formed, the interval between the horn 71 and the anvil 72 may be reduced. Because the interval is reduced, the second electrode tab 12*a* and the second current collector 64 may be easily welded by applying the ultrasonic waves of the low frequency, and the second current collector 64 may be prevented or substantially prevented from being damaged.

While the present invention has been described in connection with what are presently considered to be some practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable battery comprising:
   an electrode assembly including a first electrode and a second electrode;
   a case receiving the electrode assembly;
   a cap plate bonded to the case;
   a first terminal electrically connected to the first electrode and protruded outside the cap plate; and
   a first current collector electrically connecting the first electrode and the first terminal,
   wherein the first current collector includes an electrode attaching plate having a first thickness, and a first groove formed in a first surface of the electrode attaching plate facing in a first direction toward the first electrode, such that a thickness of the first current collector at a location of the first groove is less than the first thickness, the first current collector further including a supporting plate extending away from the electrode attaching plate and being attached to the first terminal, wherein a portion of the electrode attaching plate located between the first groove and the supporting plate has the first thickness,
   wherein the first electrode comprises a first electrode tab including a lead part extending in a protruded direction toward the cap plate and a bonding part extending from the lead part in a direction transverse to the protruded direction and comprising a welded portion welded to the first current collector in the first groove, wherein the welded portion is inserted in the first groove, and wherein a surface of the bonding part that is opposite the welded portion is exposed at a region overlapping with the welded portion in the first direction, and
   wherein the first current collector includes a second groove formed in a second surface of the electrode attaching plate facing in a direction opposite to the first direction.

2. The rechargeable battery of claim 1, wherein the bonding part is welded to the first current collector by ultrasonic welding.

3. The rechargeable battery of claim 1, wherein the first current collector comprises a plurality of protrusions in the first groove.

4. The rechargeable battery of claim 1, wherein the first current collector further includes another first groove formed in the first surface and separated from the first groove in a width direction of the first current collector.

5. The rechargeable battery of claim 1, wherein
   the first current collector includes the supporting plate bonded to the first terminal, the electrode attaching plate bonded to the first electrode, and a connecting part obliquely bent from the supporting plate and the electrode attaching plate and connecting the supporting plate and the electrode attaching plate.

6. The rechargeable battery of claim 5, wherein the supporting plate has a fuse hole, and the fuse hole extends in a width direction of the supporting plate.

7. The rechargeable battery of claim 6, wherein the supporting plate is arranged with a supporting member enclosing the fuse hole.

8. The rechargeable battery of claim 1, wherein the electrode assembly has a spiral-wound structure including a separator between the first electrode and the second electrode, and the electrode assembly includes a plurality of first electrode tabs protruded at an upper end of the electrode assembly, and the first electrode tabs are welded to the first current collector in the first groove in a stacked state.

9. A rechargeable battery comprising:
an electrode assembly including a first electrode and a second electrode;
a case receiving the electrode assembly;
a cap plate bonded to the case;
a first terminal electrically connected to the first electrode and protruded outside the cap plate; and
a first current collector electrically connecting the first electrode and the first terminal,
wherein the first current collector includes an electrode attaching plate having a first thickness, and a first groove formed in a first surface of the electrode attaching plate facing toward the first electrode such that a thickness of the first current collector at a location of the first groove is less than the first thickness, the first current collector further including a supporting plate extending away from the electrode attaching plate and being attached to the first terminal, wherein a portion of the electrode attaching plate located between the first groove and the supporting plate has the first thickness,
wherein the first electrode comprises a first electrode tab including a bonding part inserted in the first groove,
wherein the first current collector includes a second groove formed in a second surface of the electrode attaching plate facing away from the first surface formed with the first groove, and
wherein the first current collector comprises a plurality of protrusions in the second groove.

* * * * *